United States Patent [19]
Wright

[11] 4,120,791
[45] Oct. 17, 1978

[54] SLUDGE THICKENER APPARATUS AND METHOD

[75] Inventor: Francis C. Wright, Yardville, N.J.

[73] Assignee: IU Conversion Systems, Inc., Philadelphia, Pa.

[21] Appl. No.: 837,317

[22] Filed: Sep. 28, 1977

Related U.S. Application Data

[63] Continuation-in-part of Ser. No. 645,944, Jan. 2, 1976, abandoned.

[51] Int. Cl.$^2$ .............................................. B01D 21/06
[52] U.S. Cl. ...................................... 210/84; 210/523; 210/528
[58] Field of Search .................... 210/83, 84, 513, 521, 210/522, 523, 525, 527, 528-531, 532 R, 533

[56] References Cited

U.S. PATENT DOCUMENTS 1,030,271    6/1978    Arbuckle .............................. 210/521

FOREIGN PATENT DOCUMENTS 1,373,189    11/1974    United Kingdom.

OTHER PUBLICATIONS

"High-Rate Sedimentation in Water Treatment Works," Journal of American Waterworks Assn., Jun. 68, pp. 681-698.
"New-From Neptune Micro Floc-Aquarius II, " Bulletin No. KL-4231, Neptune Micro Floc Inc., Jan. 75.
"Double the Capacity of your Existing Clarifier Without Additional Structures," Sales Lit., Neptune Micro Floc, Inc., Copyright 1969.
Tube Settlers up Clarifier Throughput, "Environmental Science & Technology," vol. 6, No. 312, Apr. 72, pp. 201, 202.
Design Manual for Suspended Solids Removal, E.P.A. 625/1-75-0032, Jan. 75.
"Treatment Starts with Clarification," Power, Jun. 73, pp. 8.8-8.10.
An article by James E. White, Public Works, Nov. 1974, vol. 105, No. 11; pp. 71-72.
Parkson Corporation Bulletin LST-107 relating to "Surface Water Clarification/Sludge Thickening in One Step" publication date unknown.
"Tube Settlers for Improved Sedimentation-Viraraghavan," Pollution Engineering, Jan. 1973; pp. 38-40.

*Primary Examiner*—Frank Sever
*Attorney, Agent, or Firm*—Miller & Prestia

[57] ABSTRACT

Thickening method and apparatus includes conventional settling vessel with moving rake and pickets at the bottom thereof to promote sludge settling and compression and a plurality of inclined passageways for upwardly flowing liquid. Upflowing liquid from the hindered settling feed is clarified in the inclined passageways from which a presettled semisolid mass flows downwardly into a detention zone of compressive thickening sludge. This interrelationship of inclined passageways and compressively thickening zone enhances the effectiveness of the thickening process.

8 Claims, 5 Drawing Figures

SLUDGE THICKENER APPARATUS AND METHOD

This is a continuation-in-part of application Ser. No. 645,944, filed Jan. 2, 1976, and now abandoned, of common inventorship and assignment herewith:

This invention pertains to an improved method for settling, concentrating and removing solids from suspensions thereof and to an apparatus for utilizing that method. More specifically, this invention pertains to a method which provides much improved thickening effectiveness in a variety of applications, particularly including the removal of solids from scrubber underflow in a stack gas desulfurization scrubbing process.

The removal of solids from liquid suspensions by permitting the solids to settle in basins or vessels is well known, as is the use of moving rakes and pickets, or more commonly, rotation of radially disposed rakes and vertically extending pickets through the settled material to overcome polar and/or hydrodynamic effects tending to prevent effective solids settling and concentration. In thickeners in which these operations are carried out on a continuous basis a solids-containing liquid suspension is continuously fed to a thickener vessel and clarified liquid is continuously removed at the top of the vessel, such as by an overflow weir; at the same time settled solids with some residual liquid, commonly referred to as sludge, are removed at the bottom of the vessel.

Apart from thickening, it has also been well known to promote solids-liquid separation in clarifiers wherein the objective is to clarify liquids containing relatively low concentrations of solids, by passing the liquid upwardly through inclined passageways. The settling distance required for solids to settle out of the liquid is thus reduced and the efficiency of solids removal for a given residence time of liquid in the passageways is enhanced. These inclined passageways take a number of forms but typically they appear, in horizontal cross-section, as a plurality of chevrons or hexagons. Inclined passageways, the shapes of which (in horizontal cross-section) are substantially elongated rectangles, are also known. Such configurations may be produced by a plurality of parallel sheet members inclined at a common angle from the horizontal. These passageways may also be formed as open ended rectangles by the use of only parallel plates positioned at a common angle from horizontal using only minimal perpendicular joining members for support. Still other units are formed by parallel plates which are initially disposed at an angle of about 60° from horizontal but bending to 90° from horizontal in the lower half of the plate, all plates remaining parallel to one another.

Typically, thickening involves a hindered settling solid-liquid mixture feed. A hindered settling material is one in which the solids concentration is sufficiently high that settling particles interfere with one another mechanically and, thus, retard solid-liquid gravity separation. This contrasts with free settling characteristics typical of the low solids concentration feed in clarifying applications where the clarity of the effluent is the primary consideration.

In thickening, a high solids concentration underflow sludge is obtained primarily through the detention of the settling solids in a blanket or layer in which compressive thickening occurs. Compressive thickening involves an even higher solids concentration than a hindered settling material. The separation of water in compressive thickening occurs primarily through the weight of the solid particles on themselves tending to force water from between the particles.

Having in mind this prior art and the continuing need, notwithstanding prior art knowledge in this field, for improved and more efficient thickeners and thickening methods to remove high solids content settled material from liquid suspensions thereof, such as the scrubber underflow from stack gas desulfurization scrubbing processes, it is the general object of the present invention to provide such improved and more efficient thickening methods and apparatus.

A more specific object of this invention is to provide an improved method for receiving a hindered settling solids-liquid suspension and for efficiently removing the solids therefrom in a high solids concentration underflow.

These objects, and others which will be apparent in the course of the subsequent description of this invention, are met, briefly, by feeding a hindered settling solids-liquid mixture to a gravity settling chamber, maintaining a layer or zone of compressive thickening sludge, which may have a relatively long sludge detention time below the feed point, accelerating compressive thickening in the detention layer by the horizontal movement of vertically projecting members through the layer, and treating upflowing effluent above the feed point by passing the effluent through inclined passageways. In these inclined passageways which may be similar to tube settlers previously used in clarifying applications, hindered and perhaps some relatively free settling solids collect on the bottom walls of the passageways and drop into the detention layer below. Thus, clarified or relatively low solids concentration effluent may be removed at the top of the chamber and thickened relatively high solids concentration sludge underflow may be removed at the bottom of the chamber.

Preferably, the bottom of the chamber is provided with a rake to collect the thickened sludge for removal.

In this manner, a relatively shallow, but effectively large horizontal cross sectional area is provided for solids separation in the hindered and relatively free-settling upflowing portion of the feed material while enhancing compressive thickening by the direct introduction of presettled sludge to the compressive thickening zone. As a result, the overall settling distance and horizontal area required for production of a high solids concentration underflow is substantially reduced.

The feed means and passageway dimensions are adapted to insure substantially laminar flow of liquid through the passageways; preferably, a Reynolds number of below 800 is maintained in the passageways.

It is theorized that part of the improved efficiency of this invention results from the collection of additional solids material from upflowing liquid meeting the countercurrent downflowing pre-settled solids from the inclined passageways.

In general, relatively high solids content material, on the order of 40–80%, may be removed at the bottom of the chamber.

In the preferred embodiment of the apparatus and method of this invention, a series of plates are placed in the upper portion of the thickener, parallel to each other at an angle of 60° from horizontal. Said plates are connected by small perpendicular support pieces such that a cross-sectional view would appear as open-ended rectangles.

In another specific embodiment, the inclined passageways in the apparatus and method of this invention are disposed at an angle of 60° from the horizontal and the passageways are formed by a plurality of parallel flat or sheet members with side closure walls providing support to the sheet members. The inclined passageways in this embodiment appear as substantially elongated rectangles in horizontal cross-section.

The length to width ratio of the passageways in both of these embodiments should be in the range 10:1 to 50:1.

For a better understanding of this invention, reference is made to the following detailed description thereof, taken in conjunction with the appended claims and the drawings, in which:

FIG. 4 is an enlarged sectional view, in the plane 4—4, of the apparatus shown in FIG. 2; and FIG. 5 is a perspective view of a subassembly of the apparatus shown in the previous figures.

Figure 1:
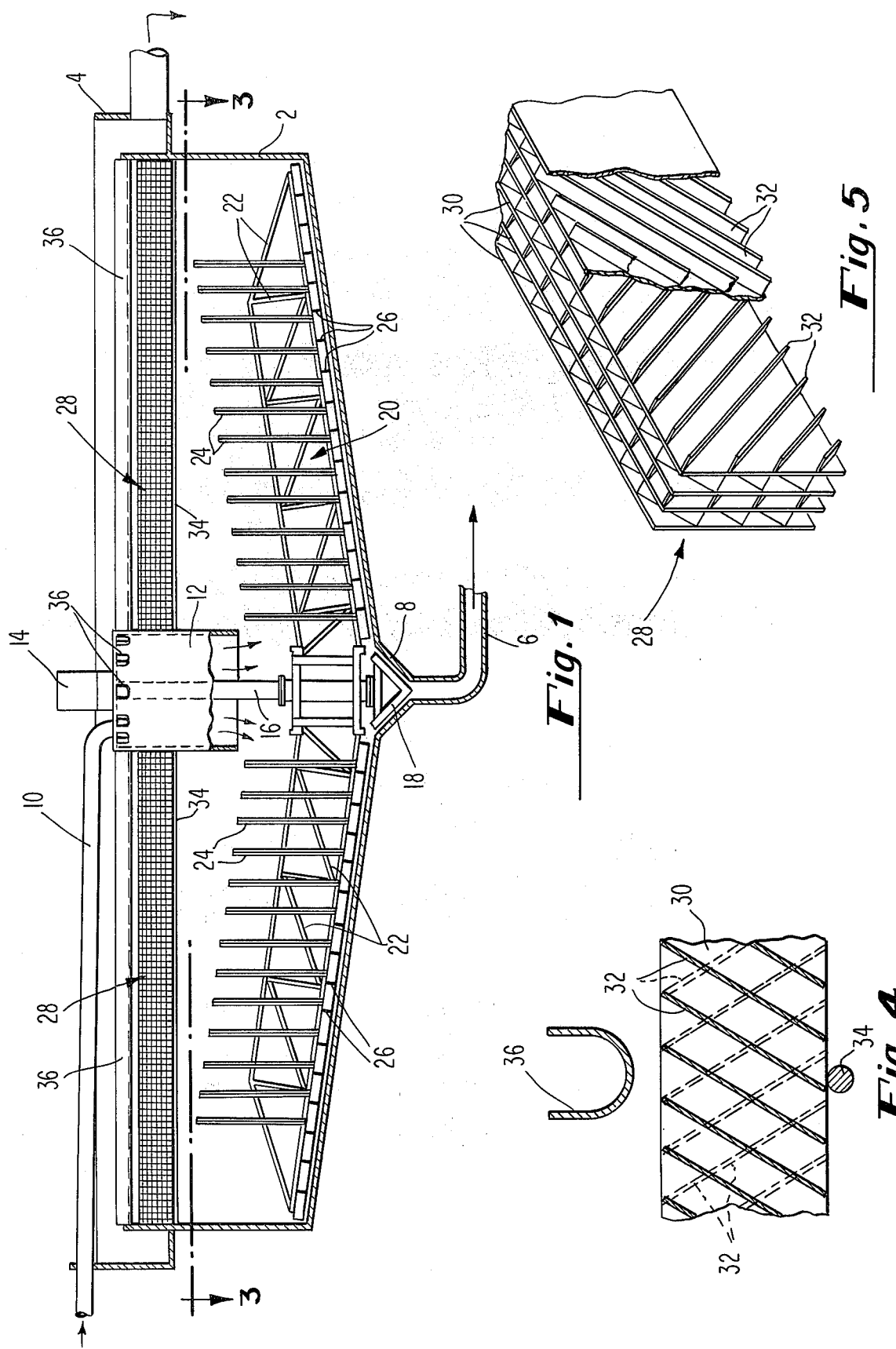
FIG. 1 is a diagrammatic elevation view, in section, of one form of thickening apparatus in accordance with the present invention.

Referring more specifically to FIG. 1, there is seen thickening apparatus including shell 2 with overflow trough 4, sludge outlet 6 and sludge hopper 8. Feed inlet 10 empties into a central cylindrical enclosure 12, in which the incoming feed is dispersed before delivery into the central fluid area of the thickening apparatus shell 2. Centrally disposed agitator drive 14 turns shaft 16 and sludge hopper stirrer 18.

Figure 3:
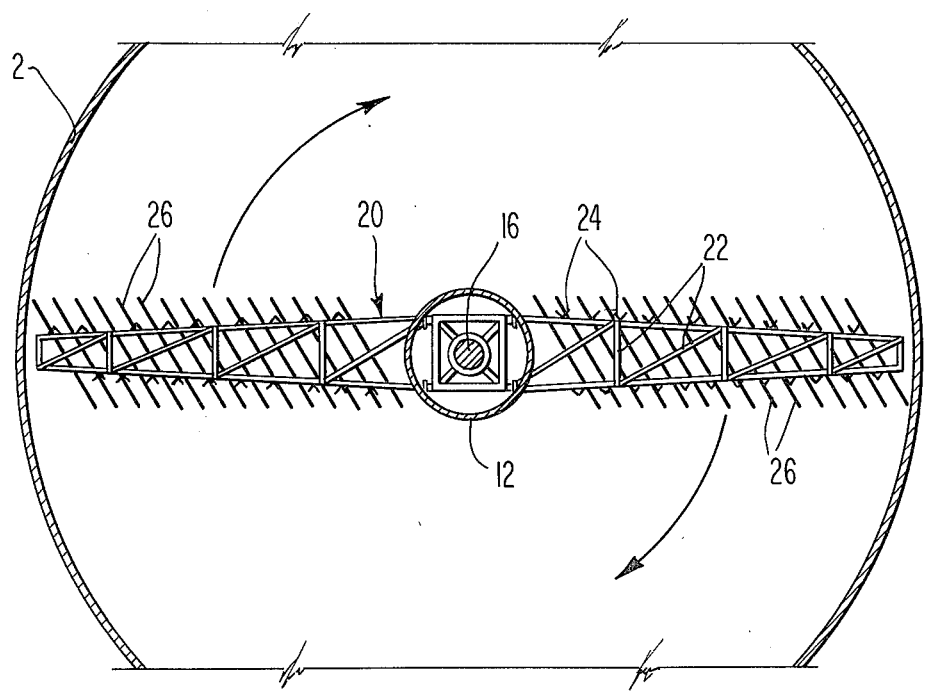
FIG. 3 is also a partial plan view, sectioned in the plane 3—3, of the apparatus shown in FIG. 1.

Also associated with shaft 16 and driven by drive means 14 is a conventional picket and rake apparatus 20, of the type commercially available from Ecodyne, I W T Division, 2720 U.W. Hwy. 22, Union, New Jersey or Denver Equipment Div., Joy Mfg. Co., Denver, Col. Picket and rake apparatus 20 includes radially disposed open work support structure 22, from which upwardly project a plurality of pickets 24, typically formed of steel angle iron, and downwardly projecting paddles or rakes 26, angularly disposed, as best seen in FIG. 3, for continually forcing settled solids at the bottom of the thickening apparatus toward sludge hopper 8.

It will be noted that feed material enters the apparatus just above pickets 24 so that solids may immediately begin settling therefrom as liquid flows upwardly in the apparatus.

An important feature of the thickening apparatus of the present invention is the provision, in combination with a picket and rake thickener 20, of a plurality of inclined passageways for upflowing, partially clarified liquid. In the apparatus illustrated, these inclined passageways are embodied in an assembly of plates comprising inclined passageway assembly 28, generally referred to sometimes herein as tube settlers.

More specifically and in accordance with one of the preferred forms of the present invention, inclined passageway assembly 28 may be purchased as a subassembly from commercial manufacturers, such as Permutit Co., Inc. of Paramus, N.J., and Neptune Microfloc, Inc., of Corvallis, Ore. Such a subassembly is seen in the perspective view of FIG. 5 to consist of a plurality of parallel vertically disposed side plates 30, each including a plurality of inclined passageways defined by a plurality of parallel angularly disposed strips 32. In the adjacent compartments formed by side plates 30, strips 32 are seen to be also angularly disposed with respect to the plates of the adjoining compartment.

Figure 2:
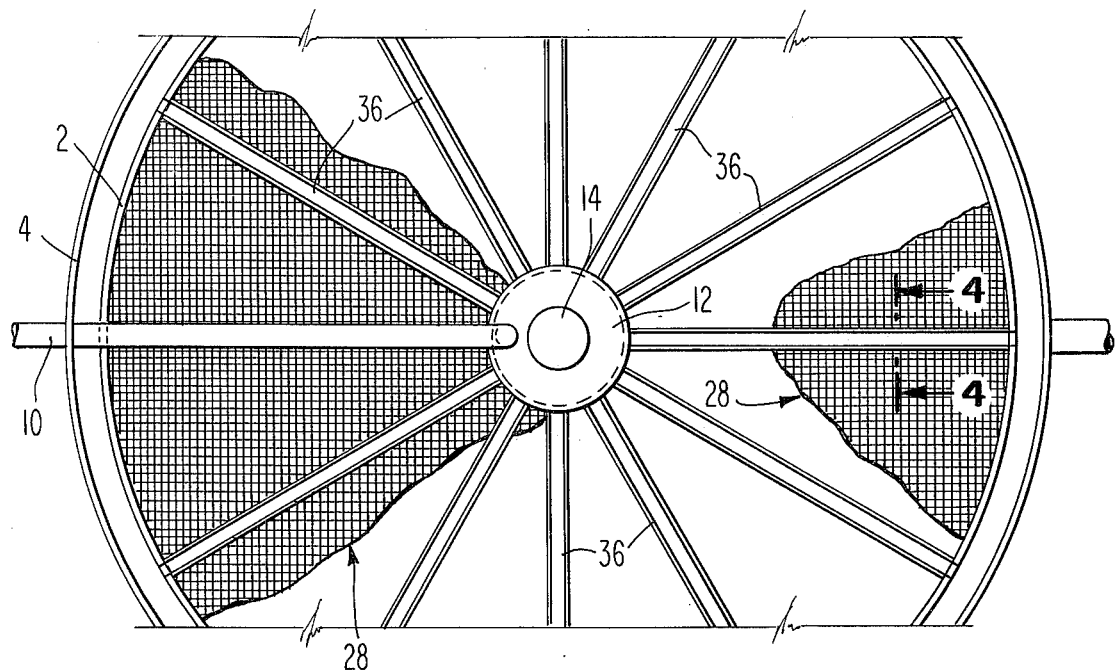
FIG. 2 is a partial plan view of the apparatus shown in FIG. 1.

As seen in the sectional view of FIG. 4, the inclined passageway assembly 28 is mounted on a number of horizontally disposed supports 34. Liquid flowing upwardly through the inclined passageways formed by the strips 32 is removed by overflowing into a plurality of channels 36, provided for that purpose, which in turn lead to overflow trough 4. Channels 36 may take any of a variety of cross-sections, including "U" shapes, "V" shaped, perforated tubes, et cetera. In addition, while effluent draw-off channels 36 may be disposed in any of a variety of geometric configurations, they are typically disposed radially, as seen in the plan view of FIG. 2.

In operation of the apparatus shown in FIGS. 1-5, the downwardly projecting rake members 26 are disposed nonperpendicularly with respect to the generally radially disposed support structure 22 of picket-rake apparatus 20 such that in the clockwise rotation of rake apparatus 20, settled solids are continuously compressed (with water being expressed therefrom in the process) and forced into the centrally disposed sludge hopper 8. Upwardly extending pickets 24 also tend to compress settled or settling solids at their leading edge in the course of the rotation of rake apparatus 20, promoting agglomeration, and therefore settling, of solid particles, while the trailing edges of upwardly projecting pickets 24 leave a low pressure wake which facilitates liquid upflow. At the same time, solids settling in the inclined passageways of the inclined passageway assembly 28 flow downwardly and are partially precompressed at the bottom of each of the passageways and fall, already partially agglomerated, into the lower thickening area of the apparatus in accordance with the present invention.

Typically, in the method of the present invention, and in the operation of an apparatus in accordance with this invention, a liquids-solids suspension, such as the clarifier underflow of a sulfur oxide scrubber, such as that used in a stack gas desulfurization scrubbing process (e.g., an aqueous slurry of 20-50% solids generally comprised of one or more calcium salts, namely carbonate, sulfate and sulfite, and in some cases, fly ash) is introduced by a feed means, not shown, through feed inlet 10 into vessel 2, wherein some solids immediately begin settling into a relatively deep (more than three feet) compressive thickening zone below feed inlet 10. A significant proportion of the solids suspended therein is swept upwardly by upflowing liquid through inclined passageways 28. There relatively free settling or less hindered settling occurs relatively rapidly in the effectively shallow but large horizontal area of the inclined passageways. Settling solids then collect on the lower surfaces of these inclined passageways, flow downwardly on these surfaces becoming somewhat compressed as they do so, and drop from the passageways into the compressive thickening sludge detention layer below.

For efficiency of settling in the inclined passageways of the thickener of the present invention, the feed rate to the thickener is generally such that the liquid overflow at the top of inclined passageways 28 (sometimes referred to as tube settlers) is less than 0.75 and preferably less than 0.15 gallons per minute per square foot cross-sectional area of the inclined passageways. (In any event, the liquid upflow rate and the dimensions and configurations of the tube settlers are adapted to perform at a higher efficiency when the velocity of the upflow slurry is low. Upflow velocities at 1-2 gpm/ft$^2$ rates typical of clarifier operation give enough turbulence to significantly decrease the tube settler performance, as a thickening device, because the velocity is sufficient to hinder solids settling, within the tube settler). Effluent flow rates of 0.05 to 0.15 gpm/ft$^2$, with compressible sludges, permit a much higher tube settler efficiency than that obtained with the same design tube settler in applications at higher upflow velocities. Such rates are therefore much preferred in the present invention.

With operation and use of this invention as described, substantially concentrated solids, at a solids content on the order of 30-80%, may then be removed from the solids outlet, with an overall thickener horizontal area on the order of 25-75% of that required in comparable thickeners of conventional design prior to the present invention. Moreover, this is accomplished with solids loading on the order of 0.1 to 0.6 ton/ft$^2$ day as compared to 0.025 to 0.1 ton/ft$^2$ day which is typical of a prior art thickener of conventional design with rakes and pickets.

By way of comparing the present invention to such conventional prior art thickeners, mathematical calculations, using a standard test method (the Kynch method) for calculating thickener area, indicate that a thickener area of 4,523 square feet is required for holding the solids of a typical desulfurization scrubbing process sludge of 180 tons/day in the compression zone at the bottom of the thickener long enough to achieve a specific percent solids underflow in accordance with a specific design objective (45-50% solids). (This conventional design would include a compressive zone sludge depth or detention layer thickener of about three feet, solids loading of 0.04 tons/ft$^2$ day and sludge detention time of 12 hours.)

The upflow area needed to permit clear water overflow through the inclined passageways or tube settlers of the present invention, is calculated to be 42% less, more specifically, 1,923 square feet. Thus, the minimum thickener size in this case is dictated by the volume required in the compression zone.

These calculations are based on a 23% solids stream expected to be received from a thickener underflow in a stack gas desulfurization scrubbing system. In actual tests, with a 23% solids feed stream, a 42% solids level has been achieved in the "tube settler" underflow. (The remainder of the thickening process should occur, of course, in the compressive thickening part of the process.) Moreover, the semi-solid material sliding down the inclined passageways showed some compression characteristics as normally occurs only in the bottom of the thickener.

While the inclined passageways (or the tube settlers) incorporated in a thickener of the present invention may take any of a variety of shapes and dimensions, generally the width and angular inclination of the passageways should be such that the maximum vertical drop within the passageways is less than 6 inches, while the angular inclination of the passageways is 50°-70° and the perpendicular distance between angularly disposed sidewalls of the passageways is 1-6 inches. Passageways of even less inclination, on the order of 45°-50°, are also possible, although some vibration of the apparatus may be necessary to cause the settled solids to flow downwardly in the inclined passageways. In the preferred form, the passageways are inclined at an angle of 60° and the shape of the passageways, in horizontal cross-section, is a substantially elongated open rectangle with a length-to-width ratio of 10:1 to 50:1. Such inclined passageways are formed by a plurality of flat or sheet members disposed parallel to one another at a common angle to the horizontal cross-section. The inclined passageways may also appear, in horizontal cross-section, as polygons having 5-12 sides. One form of such polygons is a hexagonal cross-section passageway formed in an angularly inclined honeycomb section.

In some cases, solids settling, concentration and compression is promoted by providing "V" or "U" shaped depressions in the angularly disposed sheet members. Such a configuration may be produced by providing a plurality of parallelly arrayed corrugated sheets or sheets with "V" shaped indentations.

From the foregoing, it is apparent that in the present invention, enhanced settling efficiency is obtained by the combination of (a) the horizontal movement of structural members through the compressive settling zone, (b) the effective increase of the proportionate height of the compressive zone by the provision of inclined passageways in a zone above the compressive thickening zone, and (c) the introduction directly into the top of the compressive thickening zone of a partially pre-settled solids mass.

A factor not previously stated herein, but inherent from all that has been stated, is that the relative vertical velocity of solids and liquids in the compressive zone of a thickener decreases from top to bottom within the zone. It is important, therefore, not to constrict this vertical movement by reducing the horizontal area of the zone from top to bottom. Accordingly, the compressive zone in the thickener and thickening method of the present invention should be contained within sidewalls which do not converge from top to bottom. Such converging sidewalls would be expected to impair the thickening effectiveness of any thickener involving gravity settling in a compressive zone, such as that of the present invention.

While this invention has been described with respect to specific embodiments and examples thereof, it is not limited thereto. Numerous equivalent modifications and variations may be made by those skilled in the art without departing from the true spirit and scope of the present invention. The appended claims therefore are intended to be construed to cover the present invention, including all forms and embodiments thereof.

I claim:

1. A method for separating a relatively solids-free effluent and a relatively high solids concentration thickened underflow from a feed comprising a solid-liquid mixture of sufficiently high solids concentration to be a hindered settling material, said method comprising feeding said mixture to and treating said mixture in a thickening apparatus comprising
    (I) a first horizontal section consisting of a plurality of inclined passageways,
    (II) a second horizontal section coextensive with and below said first section, said second section consisting of a compressive thickening zone in which solids concentration is increased by the compressive effects of (a) the solids-liquid mixture upon itself in said zone and (b) vertically projecting horizontally moving members therein, (III) effluent removal means above said first horizontal section,
(IV) thickened underflow removal means below said second horizontal section, and
(V) means for introducing influent hindered settling solids feed between said first and second horizontal sections whereby incoming feed partitions itself into a heavier fraction immediately being distributed at the top of said compressive thickening zone for further thickening and a lighter fraction immediately rising through said inclined passageways, said inclined passageways being adapted to receive a predominantly upflowing liquid from said feed mixture and to form a presettled solids deposit which flows downwardly into said compressive thickening zone, the solids concentration and flow rate of feed being adapted to provide relatively slow liquid upflow rates and relatively long solids detention time in said compressive thickening zone with a resultant enhancement of solids liquid separation efficiency relative to solids loading rate, the remainder of said method comprising removing from the top of said apparatus a relatively solids-free effluent and from the bottom of said apparatus a thickened high solids concentration underflow.

2. An improved method, as recited in claim 1 wherein said feed mixture comprises clarifier underflow from a sulfur oxide scrubber.

3. An improved method, as recited in claim 2, wherein the solids loading is 0.1 to 0.6 ton/ft$^2$ day.

4. An improved method, as recited in claim 1, wherein said feed mixture comprises a water suspension of one or more calcium salts from the group consisting of calcium sulfate and calcium carbonate.

5. An improved method, as recited in claim 4, wherein said passageways are inclined at an angle of 60° from horizontal.

6. Method, as recited in claim 1, wherein said movable member comprises a rotating truss with sludge collecting rakes on the bottom thereof and upwardly extending pickets on the top thereof.

7. Method, as recited in claim 1, wherein said passageways are formed by parallel plates having only interconnecting support pieces such that said plates form open-ended parallel channels.

8. Method, as recited in claim 1, wherein said passageways are formed by parallel plates having only interconnecting support pieces such that said plates form open-ended parallel channels and said plates having a length to width ratio of 10:1 and 50:1.

* * * * *